United States Patent
Makinen et al.

(10) Patent No.: US 7,931,153 B2
(45) Date of Patent: Apr. 26, 2011

(54) SOLID-LIQUID FILTRATION CLOTH AND FILTERING DEVICE

(75) Inventors: Antti Makinen, Tampere (FI); Eino Sorri, Tampere (FI); Heikki Rehakka, Tampere (FI); Aimo Rautanen, Nokia (FI)

(73) Assignee: Tamfelt Filtration Oy, Tampere (FI)

( * ) Notice: Subject to any disclaimer, the term of this patent is extended or adjusted under 35 U.S.C. 154(b) by 1106 days.

(21) Appl. No.: 10/593,631

(22) PCT Filed: Mar. 21, 2005

(86) PCT No.: PCT/FI2005/050098
§ 371 (c)(1),
(2), (4) Date: Oct. 25, 2006

(87) PCT Pub. No.: WO2005/089900
PCT Pub. Date: Sep. 29, 2005

(65) Prior Publication Data
US 2007/0144957 A1    Jun. 28, 2007

(30) Foreign Application Priority Data
Mar. 22, 2004 (FI) .................................. 20040434

(51) Int. Cl.
B01D 39/08 (2006.01)
B01D 39/16 (2006.01)
B01D 29/11 (2006.01)
B01D 29/21 (2006.01)

(52) U.S. Cl. ..... 210/489; 210/487; 210/491; 210/493.5; 210/499

(58) Field of Classification Search .................. 210/489, 210/490, 491, 493.5, 499, 487
See application file for complete search history.

(56) References Cited

U.S. PATENT DOCUMENTS

| | | | |
|---|---|---|---|
| 2,607,104 A | * | 8/1952 | Foster ........................... 428/101 |
| 3,369,668 A | | 2/1968 | Glos |
| 4,761,321 A | | 8/1988 | McCall et al. |
| 4,762,581 A | * | 8/1988 | Stancliffe et al. ............... 156/84 |
| 5,814,218 A | | 9/1998 | Cagle |
| 6,030,905 A | | 2/2000 | Striegl et al. |
| 6,418,974 B1 | | 7/2002 | King |
| 2005/0082217 A1 | | 4/2005 | Hagg et al. |

FOREIGN PATENT DOCUMENTS

| | | |
|---|---|---|
| GB | 851192 | 10/1960 |
| JP | B-37-8644 | 1/1960 |
| JP | U-45-8384 | 4/1970 |

(Continued)

OTHER PUBLICATIONS

M. Kienbaum, "Bindungstechnik der Gewebe," 1990, pp. 20-25.

(Continued)

*Primary Examiner* — Thomas M Lithgow
(74) *Attorney, Agent, or Firm* — Oliff & Berridge, PLC

(57) ABSTRACT

The invention relates to a method of making a solid-liquid filtration cloth, a solid-liquid filtration cloth, and a filter in which the solid-liquid filtration cloth is arranged. The filter cloth (7) is provided with yarns (13b) having a highly changing length and a long free run in the weave. When the length of the yarns (13b) is allowed to shorten significantly, a filtration portion (15) on the side of a surface (14) of the cloth obtains a corrugated shape, providing the cloth with a large filtering area.

7 Claims, 4 Drawing Sheets

FOREIGN PATENT DOCUMENTS

| | | |
|---|---|---|
| JP | A 2-258249 | 10/1990 |
| JP | A 8-226044 | 9/1996 |
| JP | A 8-226045 | 9/1996 |
| JP | A-09-253680 | 9/1997 |
| JP | A 10-096138 | 4/1998 |
| JP | A 2002-038354 | 2/2002 |
| JP | A 2004-052188 | 2/2004 |
| WO | WO 03-051487 A1 | 6/2003 |
| WO | WO 2004/065687 A1 | 8/2004 |
| WO | WO 2004/099478 A1 | 11/2004 |

OTHER PUBLICATIONS

Translation of Mar. 9, 2010 Office Action issued in Japanese Patent Application No. 2007-504432.

* cited by examiner

SOLID-LIQUID FILTRATION CLOTH AND FILTERING DEVICE

BACKGROUND OF THE INVENTION

The invention relates to a method of making a solid-liquid filtration cloth, the method comprising: weaving a solid-liquid filtration cloth comprising a first surface and a second surface; employing a plurality of longitudinal polymer yarns and a plurality of cross-direction polymer yarns in the weaving; and providing the solid-liquid filtration cloth with a permeability allowing liquid in a mixture to be solid-liquid filtered to permeate the cloth and, on the other hand, preventing solids from the mixture from passing the cloth.

The invention further relates to a solid-liquid filtration cloth comprising: a first surface and a second surface; a plurality of longitudinal polymer yarns and a plurality of cross-direction polymer yarns; and the solid-liquid filtration cloth having a permeability allowing liquid in a mixture to be solid-liquid filtered to permeate the cloth and, on the other hand, preventing solids from the mixture from passing the cloth.

The invention still further relates to a solid-liquid filtering device comprising: at least one filter surface having a plurality of openings; means for moving the filter surface in a rotational direction during the filtration; and a solid-liquid filtration cloth arranged against each filter surface, the solid-liquid filtration cloth having a permeability arranged to let through liquid in a mixture to be solid-liquid filtered and, on the other hand, arranged to prevent solids from the mixture from passing the cloth.

For example in the mining industry, in the refinement of metals, the forest industry, the chemical industry, and manufacturing processes for foodstuffs and pharmaceuticals, there is a need for solid-liquid filtration for separating liquid and solid particles from a mixture of solids and liquid. Various mechanical filtration apparatuses with different operating principles and properties have been developed for solid-liquid filtration. Known apparatuses include vertically and horizontally arranged chamber filters, belt filters, double fabric presses, horizontal filters, and disc and drum filters. In all these apparatuses, the principle of the filtration is to separate the liquid phase and the solid phase at least partly from each other by means of a pressure difference. Furthermore, in mechanical solid-liquid filters, the filter surface of the filtration apparatus is provided with a filtration cloth, which operates as a filtering layer. In some filtration apparatuses, the filtration cloth is moved during filtration, controlled by suitable rollers either continuously or in cycles. Furthermore, for example in disc and drum filters, a filter surface provided with a filtration cloth is moved in a basin containing a mixture to be processed, so that solids are caught on the surface of the cloth. The filter surface is moved with respect to doctor blades or the like, which guide the solids accumulated on the outer surface of the filtration cloth away from the cloth.

A factor influencing the capacity of a solid-liquid filter is the size of the filtering area of the filter. For example, in a disc or drum filter, the filtering area can be increased by increasing the diameter. However, the problem herein is that the size of the filter and, at the same time, its space requirement increases disadvantageously, whereby the efficiency of the production space per floor area may be reduced. Drum filters having corrugated sector element sides, i.e. filter surfaces, have been developed for solving the problem. A corrugated filter surface allows a larger filtering area to be provided in a disc filter than previously. In this way, the filtration capacity of a disc filter is increased without any significant change in the outer dimensions of the filter. However, the problem in this solution is the requirement that the filter sector of a disc filter be replaced with sectors provided with a corrugated filter surface. Replacement of the sectors causes significant extra costs. In addition, costs and problems arise because changes in the sectors usually cause changes also in other components and control parameters of the filtration apparatus. Accordingly, the problem is how to increase the capacity of existing filtration apparatuses.

BRIEF DESCRIPTION OF THE INVENTION

The object of the present invention is to provide a new and improved solid-liquid filtration cloth, a method of making the cloth, and, furthermore, a filtering device provided with a new kind of solid-liquid filtration cloth.

The method of the invention is characterized by arranging at least the first surface of the cloth to be corrugated, whereby the cloth has at least one outermost contact surface provided with corrugations opening away from the cloth.

The solid-liquid filtration cloth of the invention is characterized in that at least the first surface of the cloth is provided with a corrugated outermost contact surface provided with a plurality corrugations opening away from the cloth.

The filtering device of the invention is characterized in that at least an outer surface of the solid-liquid filtration cloth arranged against the filter surface is corrugated, at least a contact surface arranged against the mixture to be filtered comprising a plurality of corrugations opening away from the filter cloth.

The essential idea of the invention is to arrange a solid-liquid filtration cloth against the filter surface of a mechanical solid-liquid filtering device, the cloth comprising at least one corrugated outer surface. This being so, the cloth comprises at least one outermost contact surface provided with a plurality of corrugations opening away from the cloth.

An advantage of the invention is that the capacity of a filtering device can be increased in a simple and inexpensive manner. The solid-liquid filtration cloth according to the invention can be arranged against the filter surface of a normal filtering device, whereby the outer surface of the filter is provided with a corrugated surface. Typically, the filter surface of disc and drum filters is substantially even. The invention allows the area of such an even filter surface to be increased in a simple manner. By virtue of the corrugated surface, the area of the cloth may be more than 20% larger as compared with a conventional, even cloth. In the solution of the invention, the structure of the filtering device per se does not necessarily have to be changed at all. Furthermore, since the corrugations in the cloth open outwards, the solids cake is easily detachable at the detaching stage of the filtration cycle.

The essential idea of an embodiment of the invention is that the solid-liquid filtration cloth comprises a plurality of yarns, the length of which is significantly shortened after the weaving stage of the cloth, whereby the change in the length causes the filtration portion on the surface of the cloth to take a corrugated shape. This being so, yarns having a changing length are bound to the filtration portion at the bottoms of the corrugations.

The essential idea of an embodiment of the invention is that the solid-liquid filtration cloth comprises a plurality of highly heat-shrinkable yarns, the yarns having a long free run, i.e. the distance between the shrinkable yarns and the yarns in the cross direction relative thereto is relatively long. A plurality of yarns therefore exists between the binding points. A heat-shrinkable yarn has an initial length and is arranged to shorten significantly in the longitudinal direction when undergoing heat treatment. The material of such a yarn may be for instance polypropylene (PP), polyethylene terephtalate (PET) or polyvinylidene fluoride (PVDF). Highly heat-shrinkable yarns may draw the binding points towards each other under the action of the heat treatment, whereby the part of the filtration portion of the cloth between the binding points takes a corrugated shape. Highly heat-shrinkable yarns pass at the bottom of the cloth substantially without winding and constitute a sparse bottom or intermediate layer in the cloth. An advantage of this embodiment is, inter alia, the achievement of a relatively rigid corrugated surface in the cloth. Highly heat-shrinkable yarns passing at the bottom keep the surface of the cloth corrugated in spite of forces directed thereto. Furthermore, by virtue of its corrugated structure, the filter cloth may be so rigid that it is able to receive part of the forces directed to the filter during the filtration. In this case, the frame and filter surface of the filter do not have to be as solid as normally, but they can be manufactured from a lighter material or an otherwise lighter construction can be used therein. This allows the manufacturing costs of the filtering device to be lowered.

The essential idea of an embodiment of the invention is that the solid-liquid filtration cloth comprises a plurality of stretchable yarns having a long free run, i.e. the distance between the binding points between the stretchable yarns and the yarns in the cross direction relative thereto is relatively long. Accordingly, a plurality of cross-direction yarns exists between the binding points. A stretchable yarn has a rest length, and it can be stretched longitudinally for increasing the length of the yarn longer than the original length. The yarn is restored substantially to its original length when the force directed at a stretchable yarn stops. The material of such a yarn may be for example: polyamide (PA), polyurethane (PU) or the high-elasticity yarn according to publication U.S. Pat. No. 6,030,905, for example. When the solid-liquid filtration cloth is being woven, the stretchable yarns are stretched to a first length. During weaving, when the cloth is released from the weaving forces acting thereupon, the stretchable yarns tend to be restored to their rest length. Hereby, the length of the stretchable yarns is reduced, and as a result, the surface of the filter cloth takes a corrugated shape. By virtue of its corrugated outer surface, such a filter cloth has a large filtering area. In addition, the structure of the filter cloth is flexible, allowing the filter cloth to be tightened against the filter surface of the filtration apparatus. A flexible cloth remains well in position against the filter surface. A further advantage of the embodiment is that in disc filters of the mining industry, a snab-blow can be used for removing the solids cake, allowing the filter bag to expand owing to the stretchable yarns and thus to contribute to the removal of the solids cake.

The essential idea of an embodiment of the invention is that the surfaces on the side of both the surface and the bottom of the solid-liquid filtration cloth are corrugated. This being so, the yarns having a highly changing length constitute an intermediate portion having a sparse structure in the middle of the corrugated layers. The corrugated portions on the surface and at the bottom of the cloth may be arranged symmetrically or they can be arranged diagonally. Furthermore, the filtration portion on the side of the surface may serve as the actual filtering layer and the filtration portion on the side of the bottom may serve as a supporting structure. Either similar or different yarns and bindings can be used on the filtration portions of the surface and the bottom. Yarns having a changing length are bound to the remainder of the structure of the cloth in the inner portion of the cloth, whereby they do not pass through the upwards-opening corrugated shape.

The essential idea of an embodiment of the invention is that the area of the corrugated surface of the solid-liquid filtration cloth is 10 to 30% larger as compared with the even surface.

The essential idea of an embodiment of the invention is that the area of the corrugated surface comprises corrugation crests, the lateral distance between said crests being between 10 and 40 mm.

The essential idea of an embodiment of the invention is that the solid-liquid filtering device is a drum filter, and that the solid-liquid filtration cloth is arranged in such a manner that the grooves and crests therein pass in the axial direction of the drum filter. Accordingly, the grooves and crests are crosswise respective to the machine direction. This being so, the yarns having a highly changing length can tighten the solid-liquid filtration cloth tightly around the perimeter of the drum filter.

The essential idea of an embodiment of the invention is that the solid-liquid filtering device is a drum filter, and that the solid-liquid filtration cloth is arranged in such a manner that the grooves and crests therein pass in the circumferential direction of the drum filter. Accordingly, the grooves and crests are substantially parallel respective to the machine direction. This solution may be applied for instance when the solids cake is removed by means of a mechanical doctor blade.

The essential idea of an embodiment of the invention is that the solid-liquid filtering device is a disc filter, and that the solid-liquid filtration cloth is arranged in such a manner that the grooves and crests therein pass in the radial direction of the drum filter. Accordingly, the grooves and crests are transverse respective to the machine direction. This being so, the yarns having a highly changing length can tighten the solid-liquid filtration cloth tightly around the sector element of the disc filter.

The essential idea of an embodiment of the invention is that the solid-liquid filtering device is a disc filter, and that the solid-liquid filtration cloth is arranged in such a manner that the rotational direction of the grooves and crests therein deviates by 1° to 30° from the radial direction of the disc filter. This may improve the detachment of the solids cake in certain device assemblies.

The essential idea of an embodiment of the invention is that the filter cloth constitutes a filter element, which is a separate piece relative to the filter surface of the solid-liquid filter and can be arranged tightly against the filter surface of the filter. The filter cloth acts as the actual filtering layer in the assembly, the filter surface acting as a supporting layer.

BRIEF DESCRIPTION OF THE FIGURES

The invention will be described in more detail in the accompanying drawings, wherein FIG. 1 schematically shows a filtering device, i.e. a disc filter, applicable to solid-liquid filtration, FIG. 2 schematically shows another filtering device, i.e. a drum filter, applicable to solid-liquid filtration, FIG. 3 schematically shows the cross section of a solid-liquid filtration cloth of the invention after weaving, FIG. 4 schematically shows the cross section of the solid-liquid filtration cloth of FIG. 1 after heat treatment, FIG. 5 schematically shows the principle of a second solid-liquid filtration cloth with the cloth in a weaving loom and stretched, FIG. 6 schematically shows the solid-liquid filtration cloth of FIG. 5 after the cloth is released to its rest position, FIG. 7 schematically shows the solid-liquid filtration cloth of FIGS. 5 and 6 installed against the filter surface of a filter, FIG. 8 schematically shows the principle of still another solid-liquid filtration cloth in a situation wherein the length of the yarns having a highly changing length is at its longest, and FIG. 9 schematically shows the principle of the solid-liquid filtration cloth shown in FIG. 8 in a situation wherein the length of the yarns having a highly changing length is significantly shortened.

In the figures, the invention is shown in a simplified matter for the sake of clarity. In the figures, like parts are designated with the same reference numerals.

DETAILED DESCRIPTION OF THE INVENTION

Figure 1:
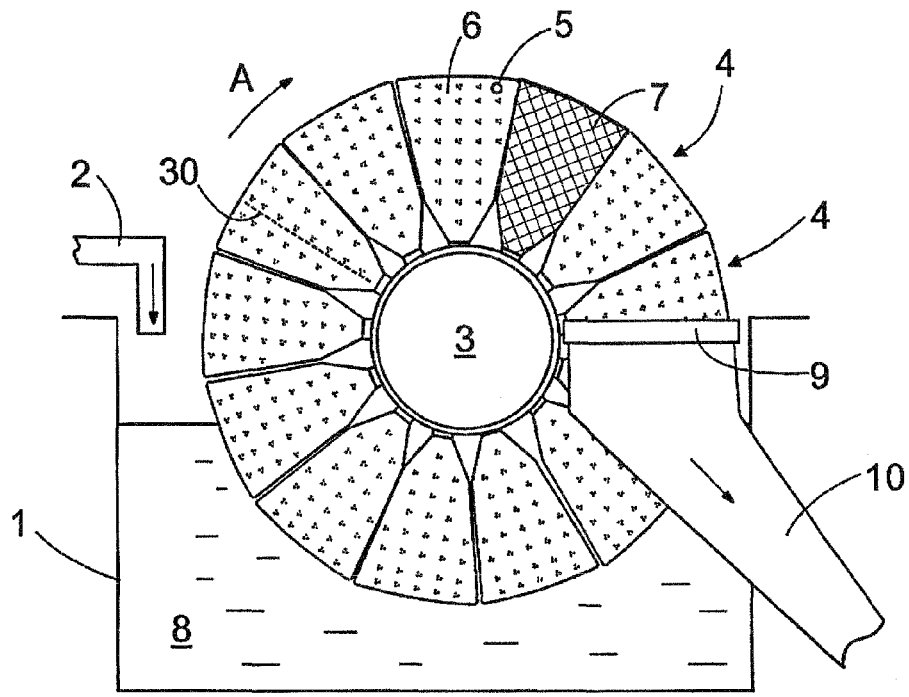

FIG. 1 shows the principle of a typical disc filter. The disc filter comprises a basin 1, into which a solution composed by a solid and a liquid is applied from a feeding channel 2. The disc filter comprises a tubular frame part 3 to be rotated around a horizontal shaft, a plurality of substantially triangular shaped sector elements 4 arranged adjacent to each other on the perimeter of the frame part in such a manner that said sector elements 4 constitute a disciform structure. The triangular flank surfaces of the sector elements 4 are provided with a plurality of openings 5, the flank surfaces acting as filter surfaces 6, against which a filter cloth 7 is arranged. For the sake of clarity, FIG. 1 only shows the filter cloth drawn on one sector element 4 and, furthermore, only one opening 5 is shown in an exaggerated size. Typically, a bag-like filter element is made from the filter cloth 7 and it can be arranged tightly on top of the sector element 4. In the filter, the filter cloth 7 acts as the actual filtering layer. The disc filter is rotated in direction A in a mixture 8 in the basin 1, and at the same time, underpressure is created inside the sector element 4. Thereby liquid is allowed through the filter cloth 7 and further through the openings 5 in the filter surface 6 into the sector element 4. The solid remains on the surface of the filter cloth 7, from where it is removed by means of doctor blades 9, pressure medium jets or the like to a discharge pit 10 before the following filtration cycle.

Figure 2:
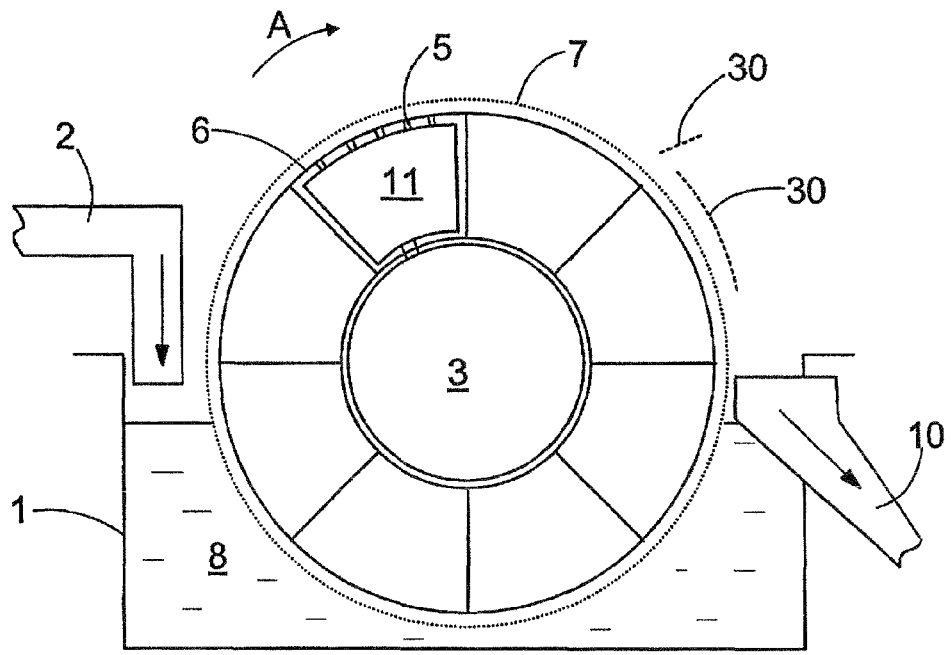

FIG. 2 shows the principle of a drum filter. A drum filter differs from the above-described disc filter in that hollow longitudinal spaces 11 are provided on the perimeter of the frame part 3, the outer perimeter of the spaces acting as the filter surface 6. In FIG. 2, the structure of only one such space 11 is shown in more detail for the sake of clarity. As the figure shows, the filter surface 6 is provided with a plurality of openings 5. The filter cloth 7 is arranged on the perimeter of the drum filter. The filter cloth 7 can be composed of one or more pieces forming a replaceable filter element. In FIG. 2, the filter cloth 7 is shown with a dashed line for the sake of clarity. The drum filter is rotated in direction A around its longitudinal axis in the basin 1 containing the mixture 8 to be treated. A solids cake generated on the surface of the filter cloth 7 can be detached by means of a doctor blade or the like to the discharge pit 10 before the following filtration cycle.

Figure 3:
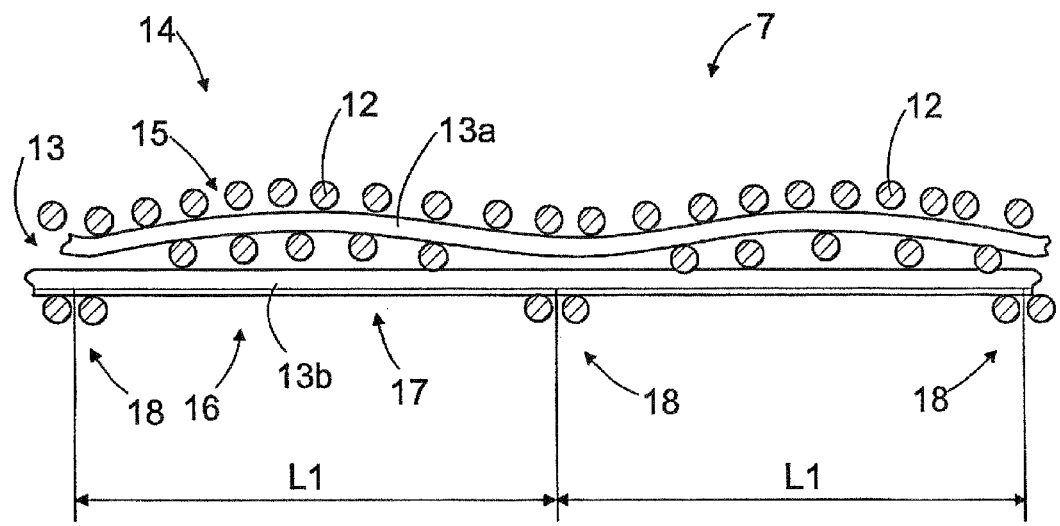

FIG. 3 shows a highly simplified cross-section of a solid-liquid filtration cloth after weaving, before heat treatment. The solid-liquid filtration cloth 7 can be woven by using a plurality of longitudinal yarns 12, which bound with a plurality of cross-direction yarns 13. In the weaving loom, the longitudinal yarns 12 may be in the warp direction and the cross-direction yarns 13 may be in the weft direction. The cross-direction yarns 13 are in two layers. The cross-direction yarns 13a passing on the side of the surface 14 of the filter cloth 7 constitute, together with the longitudinal yarns 12, a filtration portion 15 on the side of the surface 14 of the filter cloth 7. The yarns and the weave structure of the filtration portion 15 are designed to have a density letting liquid through but retaining solid particles on the side of the surface 14 of the cloth 7. Different weaves and other structures may be applied to the weaving of the filtration portion 15.

By contrast, the side of the bottom 16 of the filter cloth 7 is provided with a plurality of highly heat-shrinkable cross-direction yarns 13b bound with the longitudinal yarns 12 thus constituting, on the side of the bottom 16 of the filter cloth 7, a bottom layer 17 whose structure may be very sparse, i.e. having a high permeability. Furthermore, the high-shrink yarns 13b have a long free run, i.e. distance L1 between binding points 18 is long. In practice, the distance L1 between the binding points 18 may be along the length of more than 15 longitudinal yarns 12. In some cases, the distance L1 may be up to the length of 55 longitudinal yarns 12. In addition, the high-shrink yarns 13b pass on the side of the bottom 16 of the cloth 7 as straight as possible, and do not wind with the longitudinal yarns 12.

Figure 4:
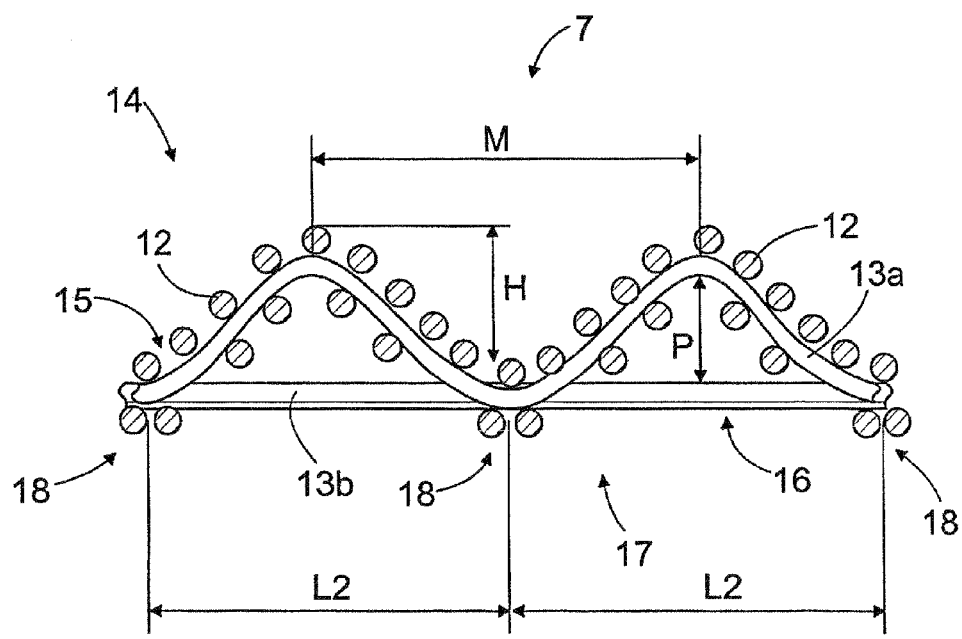

FIG. 4 shows, highly simplified, the filter cloth 7 of FIG. 3 after heat treatment subsequent to the weaving. By the action of heat, the length of the yarns 13 is highly shortened, whereby the binding points 18 have moved closer to each other, i.e. distance L2 is clearly shorter than the original distance L1. Since the cross-direction yarns 13a passing on the side of the surface 14 are either substantially non-heat-shrinkable or their shrinkage is considerably less than that of the bottom-layer yarns 13b, no significant change in length occurs on the filtration portion 15 by the action of the heat treatment. The significant change in the length of the yarns 13b of the bottom layer 17 results in the yarns 13a and consequently also the entire filtration portion 15 taking a corrugated shape as a result of the forces generated by the shrinkage. The binding points 18 are now located at the bottoms of the corrugations. The dimensions of the corrugated shape, i.e. height H of the crests of the corrugations and distance M between the crests of the corrugations depend, inter alia, on the magnitude of the shrinkage and the distance L1 between the binding points 18. The height H of the crests may be between 2 and 12 mm and the distance M between the crests may be between 10 and 40 mm. At a crest, the largest distance P between yarn 13a and yarn 13b can be between 1.5 and 11.5 mm. In addition, the corrugation is affected by the magnitude of the shrinkage difference between the high-shrink yarns 13b and the other cross-direction yarns 13a. The shrinkage of yarns 13b may be several times greater than that of yarns 13a. The shrinkage can be determined for instance according to standard SFS-EN 13844.

In some cases, the filter cloth can also be woven by the yarns 12 being wefts and, correspondingly, the yarns 13b having a highly changing length being in the warp direction during the weaving. It is also possible to arrange longitudinal yarns 12 in the cloth, which are also highly shrinkable. Such yarns 12 may be selected such that they shrink at a lower temperature than the high-shrink cross-direction yarns 13b. This allows for instance a drum filter element to be created of the filter cloth 7, in which element the shrinkable longitudinal yarns 12 are in the axial direction of the drum filter and the cross-direction yarns 13b are in the circumferential direction of the drum. In this case, the filter element may be first heat treated at a lower temperature, whereby the filter element settles correctly at the perimeter of the drum filter in the axial direction. Heat treatment at a higher temperature may then be performed, whereby the cross-direction yarns 13b shrink considerably and the filter element is tightly tightened onto the perimeter of the drum filter. This being so, the grooves and crests form in the axial direction of the drum filter.

FIGS. 1 and 2 illustrate with dashed lines 30 how the grooves and crests of a corrugated solid-liquid filtration cloth may pass at the filter surface.

It is also possible to employ other kinds of high-shrink yarns at the bottom layer 17 of the filter cloth 7. The yarns 13b do not necessarily have to be heat-shrinkable, but yarns may also be employed whose longitudinal shrinkage is achieved by directing another physical or chemical treatment at the cloth.

FIG. 3 further shows that the binding points 18 are on the opposite side of the corrugated contact surface of the cloth 7. The binding points 18 are thus located at the bottoms of the corrugations. Consequently, the yarns 13b having a highly changing length do not pass through the corrugations on the contact surface, but the corrugations open free away from the cloth 7. This allows the attachment of the solids cake to the contact surface of the cloth 7 to be avoided, whereby no problems are created at the detachment stage.

For the sake of clarity, FIGS. 5 to 9 do not show the cross-direction yarns at all. In addition, the figures are also otherwise simplified and the features characteristic of the invention are emphasized for improved clarity.

Figure 5:
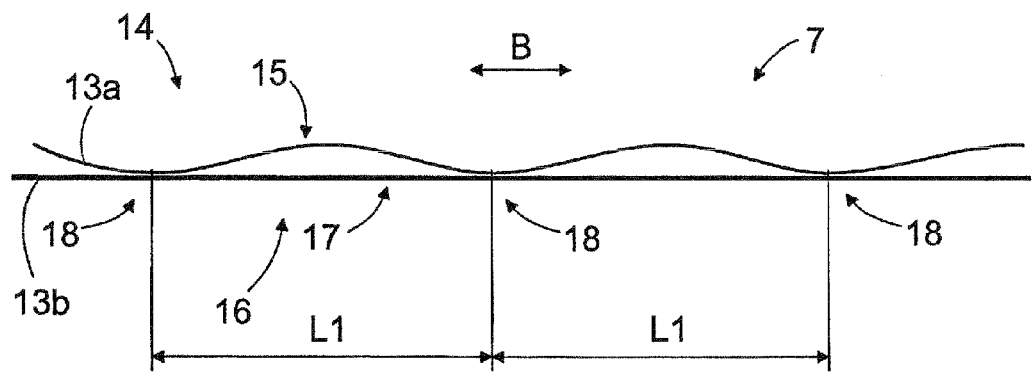
Figure 6:
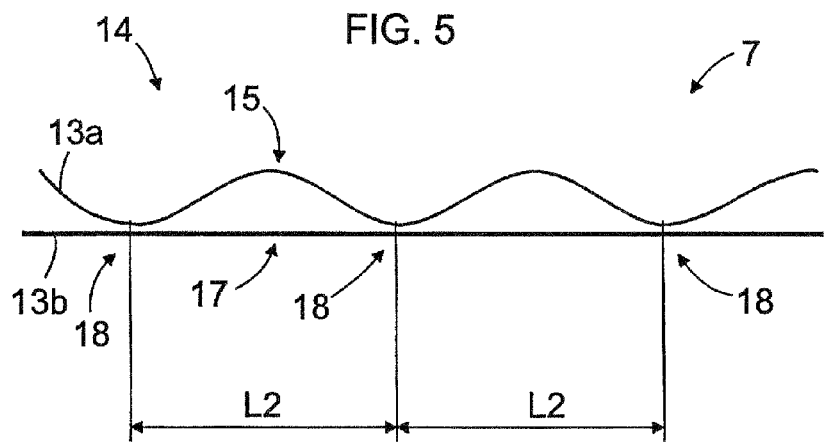
Figure 7:
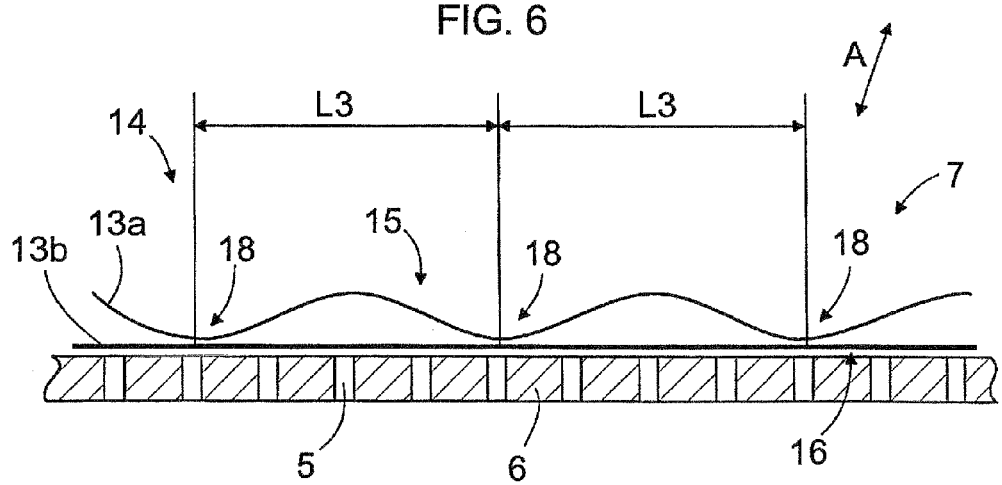

FIG. 5 shows the principle of another solid-liquid filtration cloth 7 in a situation wherein the cloth is still in the weaving loom, and is thus stretched in direction B to its full length. In this case, a plurality of stretchable yarns 13b is provided on the side of the bottom 16, whereby the length of the yarns can be increased by directing a longitudinal force thereto, their length being restored substantially to the original length after the force acting in direction B stops. During weaving, a longitudinal force is directed at the stretchable yarns 13b, since the cloth is fastened at its edges to the weaving loom. When the cloth 7 is released from the weaving loom, it assumes the form corresponding to the rest position shown in FIG. 6. The initial distance L1 between the binding points 18 changes into distance L2 when the longitudinal force stored in the stretchable yarns 13b tends to shorten the length of the stretchable yarns 13b. As a result, the filtration portion 15 on the surface 14 of the cloth 7 takes a corrugated shape. FIG. 7 further shows a situation wherein the filter cloth 7 is arranged against a filter surface 6 provided with openings 5. A filter element, arranged on top of a sector, perimeter of the like frame part belonging to the filter, may be made from the filter cloth 7. The filter element may be dimensioned such that in the rest position it is somewhat, e.g. 10 to 20% smaller than the frame part of the filter, whereby the filter element has to be somewhat stretched when being installed in position. In this case, the length of the stretchable yarns 13b increases and a force is stored therein that keeps the filter element tight against the filter surface 6. As FIG. 7 shows, distance L3 is between the binding points 18, its magnitude being between distances L1 and L2. An advantage of such a stretchable filter cloth 7 is that it is relatively easy to install in position and yet it remains well in position during the filtration. The material of the stretchable yarns 13b may be for instance: polyamide (PA), polyurethane (PU) or the high-elasticity yarn according to publication U.S. Pat. No. 6,030,905, for example.

Figure 8:
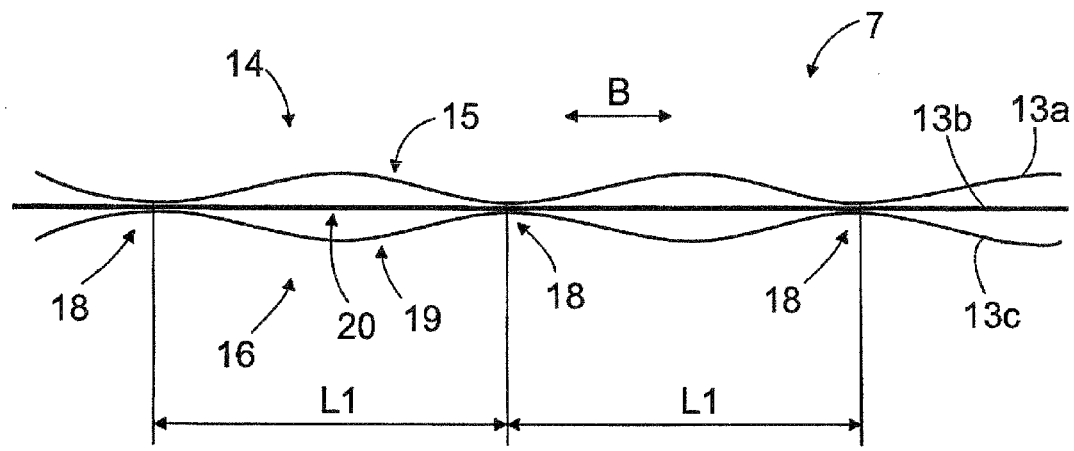
Figure 9:
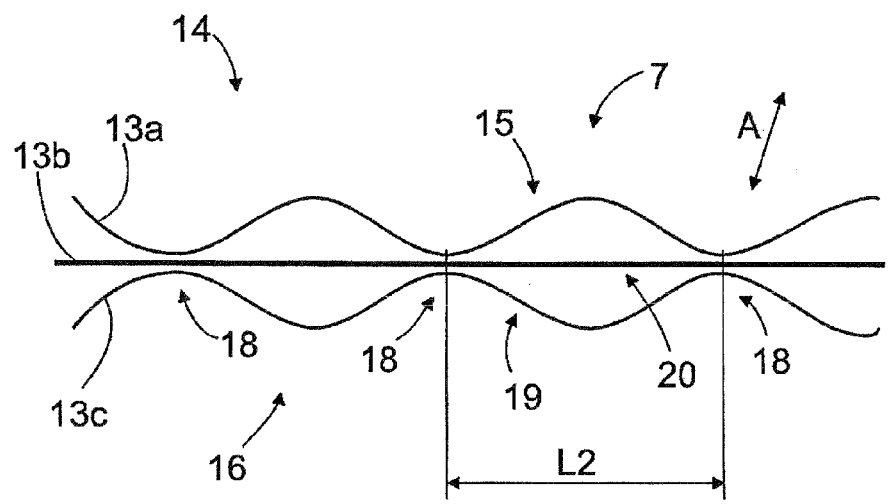

FIG. 8 further shows the principle of a third solid-liquid filtration cloth 7. In FIG. 8, the cloth 7 is shown before heat treatment and in FIG. 9 after heat treatment, the length of the heat-shrinkable yarns 13b in the cloth having shortened significantly. In contrast to the solutions presented in the previous figures, a filtration portion 19 on the side of the bottom 16 is provided on the side of the bottom 16 of the solid-liquid filtration cloth 7, whereby a sparse intermediate portion 20 composed of highly heat-shrinkable yarns 13b is provided between the filtration portions 15 and 19, the intermediate portion not participating in the actual filtration. As FIG. 9 shows, after heat treatment, the filtration portion 15 on the side of the surface 14 of the cloth 7 has a corrugated cross-sectional shape. This being so, the filter cloth 7 has a substantially larger filtering area than have conventional filter cloths. The area may be 10%, even 30% larger than that of cloths having an even surface. Furthermore, the second filtration portion 19 on the side of the bottom 16 of the filter cloth 7 also has a corrugated cross-sectional shape. In this case, open spaces remain between the bottom 16 of the cloth 7 and the filter surface 6 on the portions between the crests. In these spaces, the liquid that has permeated the filter cloth 7 may flow toward the openings 5 on the filter surface 6. The second filtration portion 19 may be made sparser than the outer filtration portion 15.

In FIG. 9, the binding points 18 are inside the cloth 7 between the corrugated contact surfaces. The binding points 18 are thus located at the bottoms of the corrugations inside the cloth 7. Consequently, the yarns 13b that have a highly changing length do not pass through the corrugations on the contact surfaces, but the corrugations open on each contact surface free away from the cloth 7.

In the solid-liquid filtration cloth 7 according to FIGS. 3 to 9, either stretchable yarns, highly heat-shrinkable yarns, or other yarns suitable for the purpose may be employed, the length of which can be significantly changed in the desired manner. As is shown in FIGS. 5 to 9, the cross-section of a stretchable yarn, a highly heat-shrinkable yarn or the like yarn 13b can be dimensioned larger than that of the other parallel yarns 13a and 13c. The dimensioning of the yarns 13b can be selected in a manner generating a sufficient force to achieve a corrugated shape. By contrast, the dimensioning of the yarns 13a and 13c may be arranged in a manner allowing the desired filtering characteristics to be achieved in the cloth.

Let it be mentioned that the cloth 7 may have another corrugated shape than is shown in FIGS. 4 to 9 by way of example. For example, in the solution of FIGS. 8 and 9, the crests in the filtration portion 15 on the side of the surface may be arranged at different points than the crests in the filtration portion 19 on the side of the bottom 16. This being so, the structure is diagonal.

Furthermore, in a double corrugated structure such as that of FIGS. 8 and 9, the distances L1 between the binding points 18 may be dimensioned to be of different magnitudes on the side of the bottom 16 and the surface 14 of the cloth, if need be.

Although a disk filter and drum filter were described above by way of example, the invention is applicable in connection with mechanical solid-liquid filters of other kinds.

The drawings and the related description are only intended to illustrate the idea of the invention. The details of the invention may vary within the scope of the claims.

The invention claimed is:

1. A solid-liquid filtration cloth, comprising:
   a first outer surface and a second outer surface;
   a plurality of longitudinal polymer yarns and a plurality of cross-direction polymer yarns; and
   a solid-liquid filtration cloth having a permeability allowing liquid in a mixture to be solid-liquid filtered to permeate the cloth while preventing solids from the mixture from passing the cloth,
   wherein at least the first outer surface of the cloth is provided with a corrugated outermost contact surface provided with a plurality corrugations opening away from the cloth,
   the second outer surface of the cloth is substantially even, and the solid-liquid filtration cloth constitutes a bag-shaped filtration element for disc filtration.

2. A solid-liquid filtration cloth as claimed in claim 1, wherein a filtration portion suitable for solid-liquid filtration comprises a plurality of cross-direction yarns provided on a side of the first outer surface of the cloth, the cloth comprises a portion composed of yarns having a changing length, the corrugated surface is provided with crests of corrugations, and at the crests, a maximum distance between the cross-direction yarns and the yarns having a changing length of the filtration portion is at least 1.5 mm.

3. A solid-liquid filtration cloth as claimed in claim 1, wherein at least a side of the first outer surface of the cloth is provided with a filtration portion having a corrugated shape and comprising crests and bottoms of corrugations, the cloth comprising highly heat-shrinkable cross-direction yarns whose length is shortened in heat treatment subsequent to weaving, the highly heat-shrinkable yarns are bound to the filtration portion at binding points, and the binding points are located at the bottoms of the corrugations, and are part of the integrally woven structure of the first outer surface and the second outer surface.

4. A solid-liquid filtration cloth as claimed in claim 1, wherein at least a side of the first outer surface of the cloth is provided with a filtration portion having a corrugated shape and comprising crests and bottoms of corrugations, the cloth comprises cross-direction stretchable yarns having, after weaving, a rest length shorter than the length of the yarns during weaving, the stretchable yarns are bound to the filtration portion at binding points, and the binding points are located at the bottoms of the corrugations, and are part of the integrally woven structure of the first outer surface and the second outer surface.

5. A solid-liquid filtration cloth as claimed in claim 1, wherein the first outer surface of the cloth has corrugations in one direction only.

6. A solid-liquid filtration cloth as claimed in claim 1, wherein at least a side of the first outer surface of the cloth is provided with a filtration portion having a corrugated shape and comprising crests and bottoms of corrugations, the cloth comprising highly heat-shrinkable cross-direction yarns whose length is shortened in heat treatment subsequent to weaving, the highly heat-shrinkable yarns are bound to the filtration portion at binding points, the binding points are located at the bottoms of the corrugations, and the highly heat-shrinkable yarns cross yarns of the filtration portion at the binding points as part of the integrally woven structure of the first outer surface and the second outer surface.

7. A solid-liquid filtration cloth as claimed in claim 1, wherein the first outer surface of the cloth is entirely corrugated.

* * * * *